United States Patent [19]
Criswell

[11] Patent Number: 5,224,663
[45] Date of Patent: Jul. 6, 1993

[54] VEHICLE PROPULSION SYSTEM WITH EXTERNAL PROPELLANT SUPPLY

[76] Inventor: David R. Criswell, 16419 Havenpark Dr., Houston, Tex. 77059

[21] Appl. No.: 723,894

[22] Filed: Jul. 1, 1991

[51] Int. Cl.[5] .............................................. B64D 39/00
[52] U.S. Cl. ................................ 244/1 R; 244/1 TD; 244/135 A
[58] Field of Search ..................... 60/39.02, 39.06, 726, 60/728, 270.1; 244/1 R, 1 TD, 2, 53, 62, 73, 74, 135 A, 161

[56] References Cited

U.S. PATENT DOCUMENTS

| | | | |
|---|---|---|---|
| 2,907,536 | 10/1959 | Von Zborowski | 60/270.1 |
| 2,946,605 | 7/1960 | Mosher | 244/135 A |
| 3,011,737 | 12/1961 | Morrow | 244/135 A |
| 3,091,419 | 5/1963 | Mosher | 244/135 A |
| 3,313,103 | 4/1967 | Johnson | 60/39.06 |
| 3,586,065 | 6/1971 | Bowles | 244/135 A |
| 4,754,601 | 7/1988 | Minovitch | 60/204 |
| 5,085,048 | 2/1992 | Kutschenreuter, Jr. et al. | 60/270.1 |

FOREIGN PATENT DOCUMENTS 0248340 12/1987 European Pat. Off. .

OTHER PUBLICATIONS

*Probing and Drogueing*, Flight Issue #2284, Oct. 31, 1952, p. 567.
"Magnetic Propulsion Along an Orbiting Grain Stream", Benoit A. Lebon, *Journal of Spacecraft and Rockets*, vol. 23, No. 2, Mar.-Apr. 1986, pp. 141-143.
"Laser to Lift Lightcraft into Space", Bill Siuru, *Mechanical Engineering*, No. 9, Sep. 1990, pp. 54-57.

*Primary Examiner*—Joseph F. Peters, Jr.
*Assistant Examiner*—Anne E. Bidwell
*Attorney, Agent, or Firm*—Brown, Martin, Haller & McClain

[57] ABSTRACT

A vehicle propulsion system for accelerating a vehicle along a desired travel path in the atmosphere, space, or aerospace includes a trail laying device for laying a trail of fuel along at least part of the desired travel path at high altitude. The vehicle itself has one or more inlets arranged to ingest fuel from the trail into a combustion chamber where the fuel is ignited and burnt to provide thrust before being expelled via an exhaust. The trail of fuel is laid in a similar manner to a condensation trail of a jet aircraft, but with suitable propellant additives for providing the desired fuel mixture to the trailing vehicle. The vehicle includes an auxiliary propulsion system for propelling the vehicle when outside the fuel trail.

43 Claims, 7 Drawing Sheets

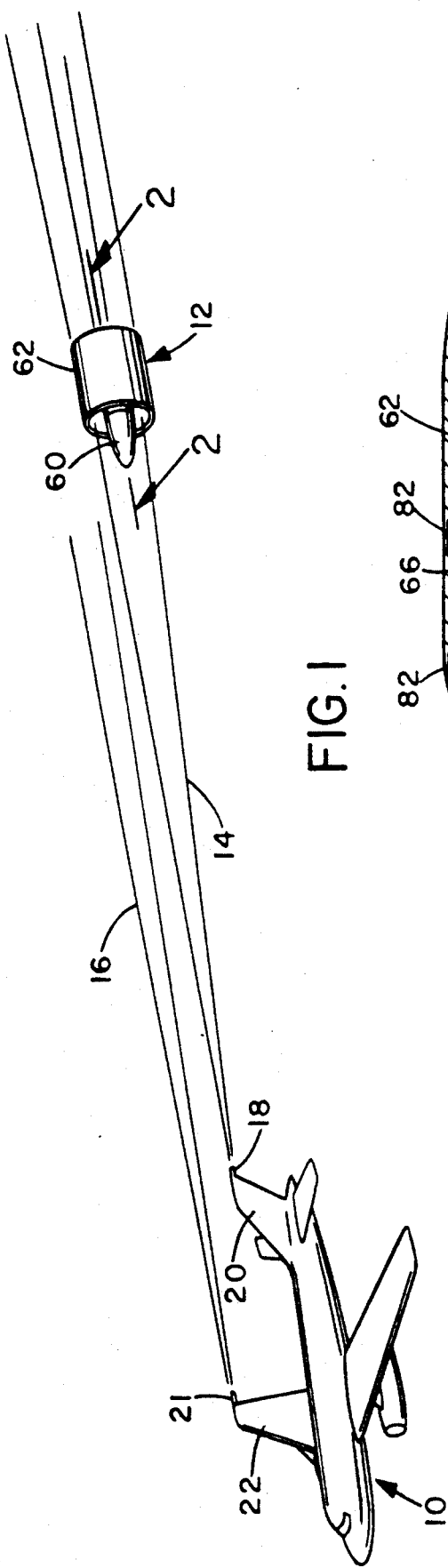
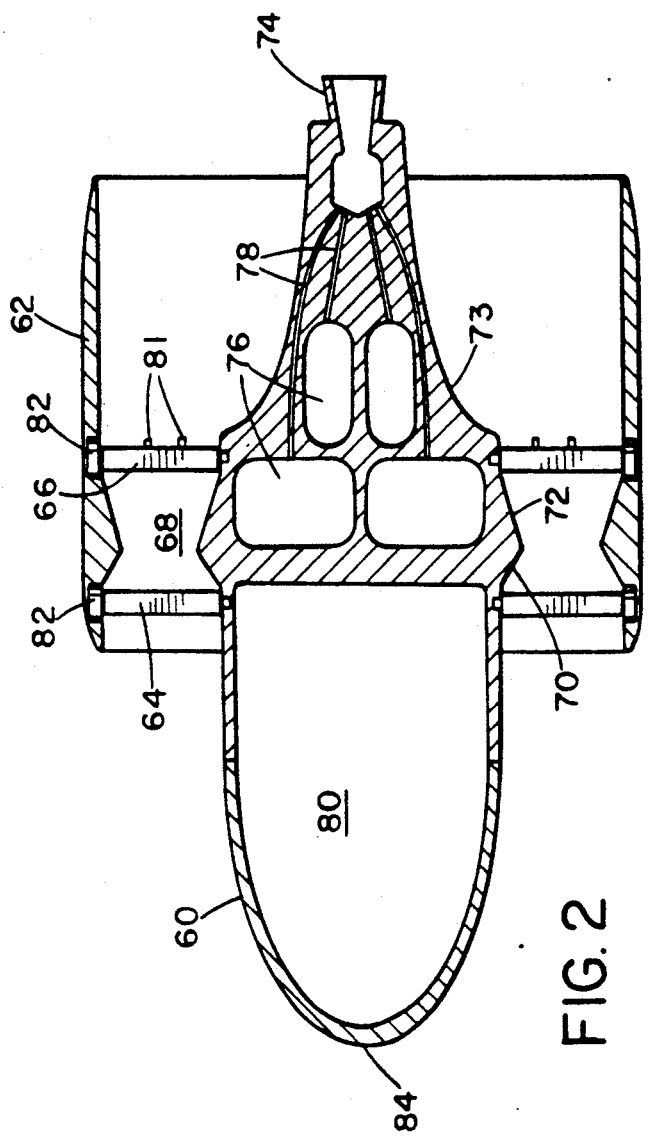
FIG. 1
FIG. 2

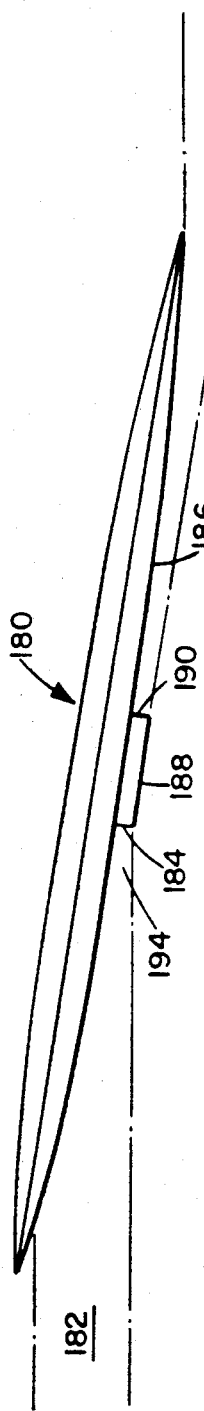
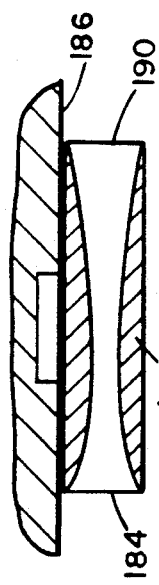
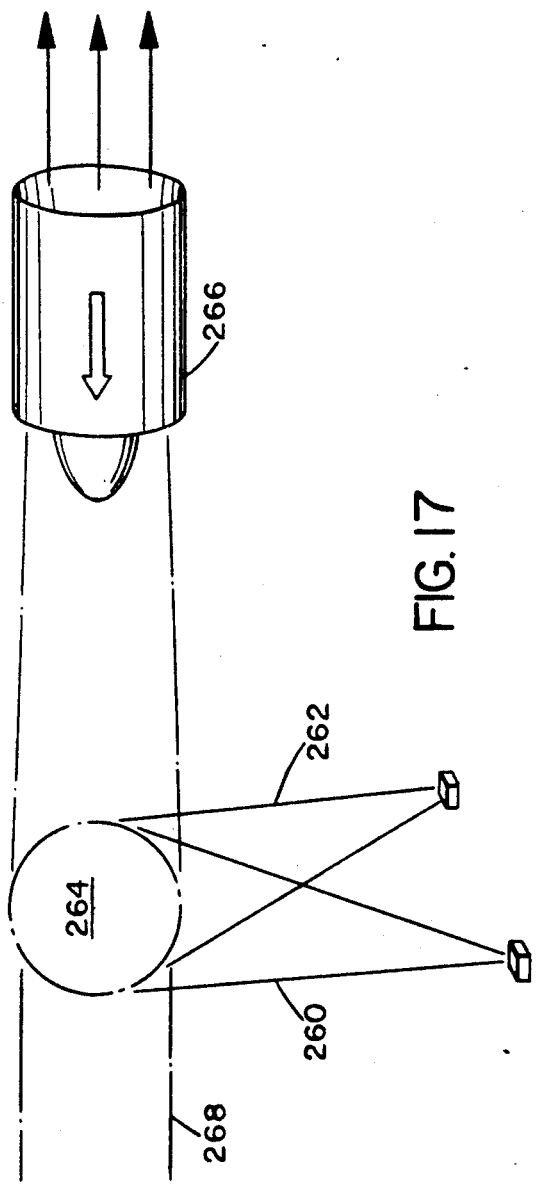

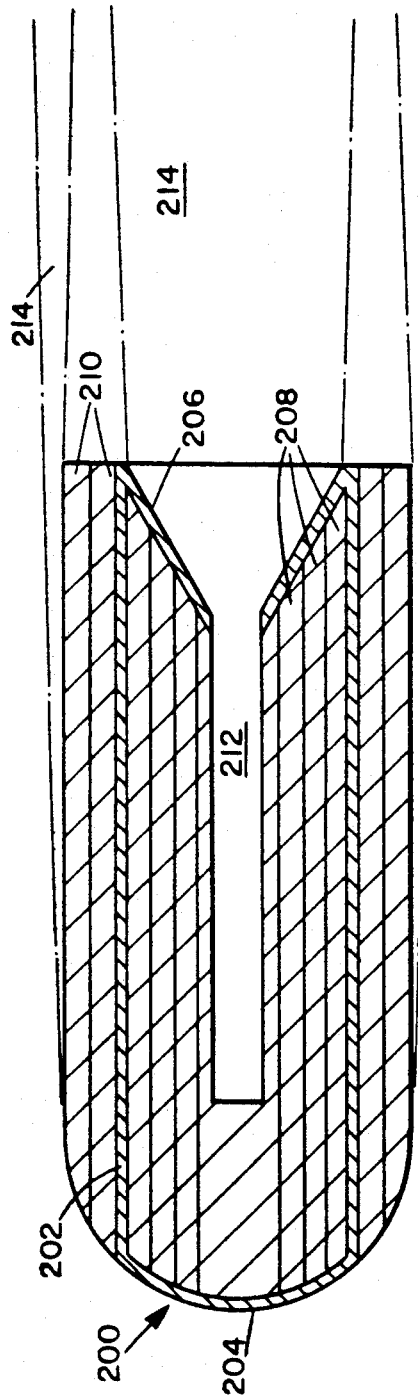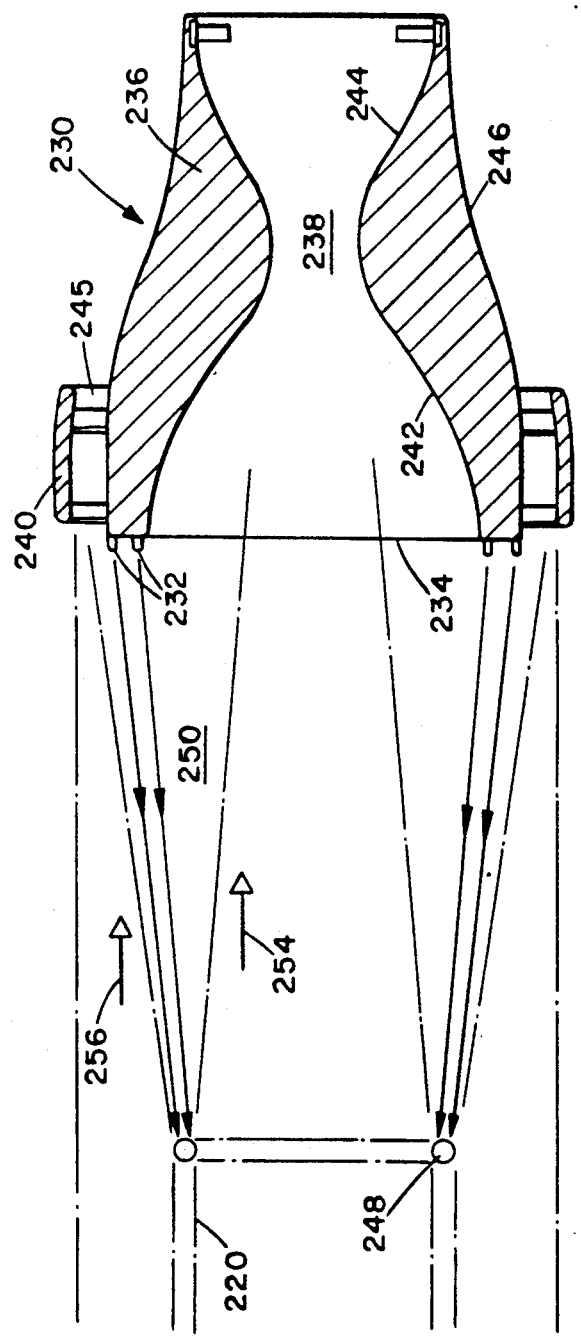

VEHICLE PROPULSION SYSTEM WITH EXTERNAL PROPELLANT SUPPLY

BACKGROUND OF THE INVENTION

The present invention relates generally to propulsion systems for aircraft or space vehicles such as airplanes, aerospace vehicles, rockets and other spacecraft.

On-board propulsion systems such as air breathing engines and rocket propulsion devices have been devised for accelerating vehicles to high speed. Rocket propulsion systems for launching vehicles into space are often chemically powered and contain one or more internal propellants. These systems have two major limitations. One is that the duration of thrust is limited by the amount of propellant the rocket can contain. Another is that only a fraction of the propellant energy goes into the payload. Much of the propellant energy goes into accelerating and lifting the mass of propellant and propulsion related components, leaving little room for the non-propulsive elements of the vehicle and the payload. With the current state of the art of rocket flight from earth to space, approximately 90% of the initial weight is propellant related, 5% is structural, and only 5% can be allotted to the payload to be transported into space. This is clearly an inefficient system.

Air breathing jet engines produce thrust in the same manner as rocket engines, but draws one of its propellants from the ambient gas through which it flies, requiring only about ⅛ of the propellant load of an equivalent rocket engine that burns hydrogen and oxygen. A disadvantage of these engines is that oxygen availability decreases with altitude, and that the vehicle must fly at a higher altitude with increasing speed in order to keep atmospheric drag less than the thrust. Thus, design of an air breathing earth to orbit vehicle, or aerospace plane, which would operate safely and efficiently would be extremely difficult. With increasing Mach number, it becomes progressively more difficult to inject fuel into and through the boundary layer, and the rapidly moving air stream may sweep fuel out of the engine before chemical burning is complete. Additionally, the effectiveness of aerodynamic lift decreases with increasing Mach number, requiring use of a greater fraction of the thrust to drive the craft upward. For these reasons, the aerospace plane must fly a very exact trajectory at low acceleration, which results in prolonged heating and loss of much energy to drag. The types of materials needed for construction of an aerospace plane to withstand the prolonged heating are not available at this time. Thus, there are still many outstanding problems with existing aerospace plane proposals, and such vehicles would still have to carry a significant weight of propellant, reducing payload capacity.

Another recent concept in attempting to alleviate the problems of internal propellant load is that of the ram accelerator. In this proposal, a long tube is filled with a combustible mixture of gases such as oxygen and methane or hydrogen. A cylindrically symmetric vehicle in the form of the compressor section of a ram jet is introduced into the tube at sufficient speed to compress the ambient gas to form a shock about aft of its mid-body. Combustion of the gas occurs aft of the shock. The vehicle does not have to carry any propellant. Exit speeds in excess of 10 km. per second can be obtained. A quick opening door or breakable barrier at the end of the tube permits the vehicle to exit. However, this system has a number of limitations, and does present hazards. It is doubtful that a ram accelerator could be used to launch people into space or between points on earth due to the accelerations in the tube, and also due to atmospheric deceleration of the vehicle on leaving the tube. Also, a tube several hundred feet long that is repeatedly filled with a combustible mixture of gases presents an intrinsic hazard. All or a major portion of the capital investment can be lost due to one explosion or due to a vehicle which hits the tube at high speed. A given tube can eject vehicles into only a limited set of trajectories. Little adjustment can be made to the vehicle dimensions to accommodate different payloads, since a vehicle which is too long or too heavy cannot be adequately accelerated by a given tube and gas mixture.

Thus, existing and currently proposed propulsion systems for earth to space or flights from one region of earth to another do not overcome the problems of devoting a major portion of the flight energy to the transportation and acceleration of propellant mass, considerably reducing payload capabilities.

SUMMARY OF THE INVENTION

It is an object of the present invention to provide a new and improved vehicle propulsion system for flying a vehicle along a path from earth to space, between points in space, to or from other or about other celestial bodies or between two locations on earth which allows a larger portion of the vehicle weight to be devoted to payload.

According to the present invention, a vehicle propulsion system is provided, which comprises a vehicle designed for flight along a travel path through a surrounding environment such as earth's atmosphere and/or space, and a trail laying device for laying a trail of propellant material in the free surrounding environment along at least part of the vehicle's travel path in advance of the vehicle. The vehicle itself has a propellant inlet for ingesting at least some of the propellant distributed along its path, a combustion chamber for burning the ingested propellant to accelerate it along its path, and an exhaust for expelling the burnt propellant from the vehicle.

The propellant trail is preferably of a similar structure to a condensation trail as laid behind an aircraft. It is known that a flying aircraft leaves behind it a trail of condensible vapor and particles that can remain confined to a relatively small cross sectional area over extended periods of time. Condensation trails result from the cooling of the water vapor introduced into a fixed mass of air. The water vapor cools to the ambient temperature of the air and then condenses. The water or other vapor or smoke introduced into the air in the wake of an aircraft condenses onto particles in the atmosphere, such as small ice fragments or droplets, to produce the trail. These types of trails are used in skywriting, for example. Jet aircraft regularly produce contrails that are tens of miles to hundreds of miles long. Thus, a condensation trail which contains predetermined amounts of gaseous, solid, or liquid fuel may be laid down for ingestion by the trailing vehicle. The trail may be laid down over a large range of altitudes and lengths, from ground level to the top of the atmosphere.

In one preferred embodiment of the invention, the propellant trail is in the form of atoms, molecules, droplets or grains that are small enough that they will not diffuse quickly away from the injection region, to form a well defined trail of fuel rich air. The propellant trail will contain almost all the propellant necessary for propelling the vehicle along its path, apart from that required for initial launching of the vehicle onto the path. In this way, a higher proportion of the vehicle mass can be devoted to payload, and very little energy goes into the acceleration of internal propellants.

Although in the preferred embodiment of the invention the trail is similar to an aircraft contrail and is laid in a reactive atmosphere such as air, it may alternatively be laid in space. The propellant trail may be partly gaseous, e.g. air, hydrogen and/or methane, and partly in the form of a mist of very small liquid drops, for example air and JP4 drops. The oxidizer need not be air but may be a liquid or solid with a low vapor pressure. The exact nature of the propellant mix will depend on the pressure and temperature of the ambient atmosphere in which the trail is to be laid and also on the conditions under which the propellant is to be dispersed into the atmosphere, and the nature of the propellant may be varied along the trail to allow for variations in the condition of the surrounding atmosphere. The propellant trail can consist of many more combinations of fuels and oxidizers than are possible with rockets or jets which carry internal propellants, and may be laced with ignition promoters such as silane grains or gas to promote combustion.

If the contrail is in the form of liquid drops or a mixture of gas and liquid drops, it is laid in the same manner as an aircraft contrail or in sky writing, i.e. dispersed as a cloud or fog of droplets or ice particles. However, the components of the trail may be all gaseous, such as hydrogen or methane combined with the oxygen in the air. In this case, the trail can be formed with turbulence to form a trail of enhanced duration to be picked up by the trailing vehicle.

The trail may be laid in extremely tenuous atmosphere or outer space in a similar manner, using a dust or fog of mono-propellant, ultra-fine grains distributed along a path in space, laid down by a rocket or an artillery shell or the like.

In a preferred embodiment of the invention, the trail is laid by a leading aircraft or vehicle and subsequently picked up by the trailing vehicle, which does not need to carry any significant amounts of propellant and thus can carry a much larger proportion of its weight as payload. Alternatively, the propellant trail may be created by the vehicle itself, for example by lasers or microwave beams which energize molecules in the atmosphere in advance of the vehicle just before the vehicle arrives and interacts with them. Alternatively, the vehicle itself could lay its own trail, first acting as a fuel tanker flying along a predetermined flight path at relatively low speed and acceleration to lay the fuel or propellant trail, for example in an east to west direction. Then, for example, the vehicle flies back through the trail in a west-to-east direction and causes the deposited propellants to react so as to accelerate the vehicle along the trail. In this way, little energy has to be expended in accelerating the propellants, but the majority of the energy can be used to accelerate the vehicle structure and its payload.

Typically, combustion of the propellants will produce a high-speed flow of exhaust gases from the vehicle. In order to avoid or reduce loss of energy due to accelerating exhaust gases, the vehicle may be arranged to ingest the trail in such a manner that exhausted materials from the vehicle come closer to rest in the Newtonian inertial frame.

The fuel ingested from the trail may be actively ignited via a suitable ignitor, or may alternatively be passively ignited, for example by suitable compression surfaces producing a shock to ignite the fuel.

With this arrangement, the vehicle uses propellant distributed along its flight path and therefore does not itself have to transport a significant quantity of propellant, providing additional payload capacity. Another advantage is the removal of most of the hazardous propellants from the vehicle during mission preparation and operation. It is not necessary to design the vehicle using very light weight structures and materials, since the vehicle does not have to carry a heavy weight of propellant, and thus stronger materials and structures can be used for increased safety.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a perspective view of a vehicle propulsion system according to a first embodiment of the invention;

FIG. 2 is a vertical cross-sectional view of the trailing, fuel ingesting vehicle of FIG. 1;

FIG. 13 is a side elevational view of a fuel ingesting aerospace plane according to another embodiment of the invention;

FIG. 14 is a cross-section of the jet engine of the plane of FIG. 13;

FIG. 15 is a vertical cross-section of a trail laying vehicle according to a further embodiment of the invention;

FIG. 16 is a vertical cross-section illustrating a fuel ingesting vehicle which energizes the trail according to another embodiment of the invention; and FIG. 17 is a perspective view illustrating a modification to the system of FIG. 1.

DESCRIPTION OF THE PREFERRED EMBODIMENTS

Figure 3:
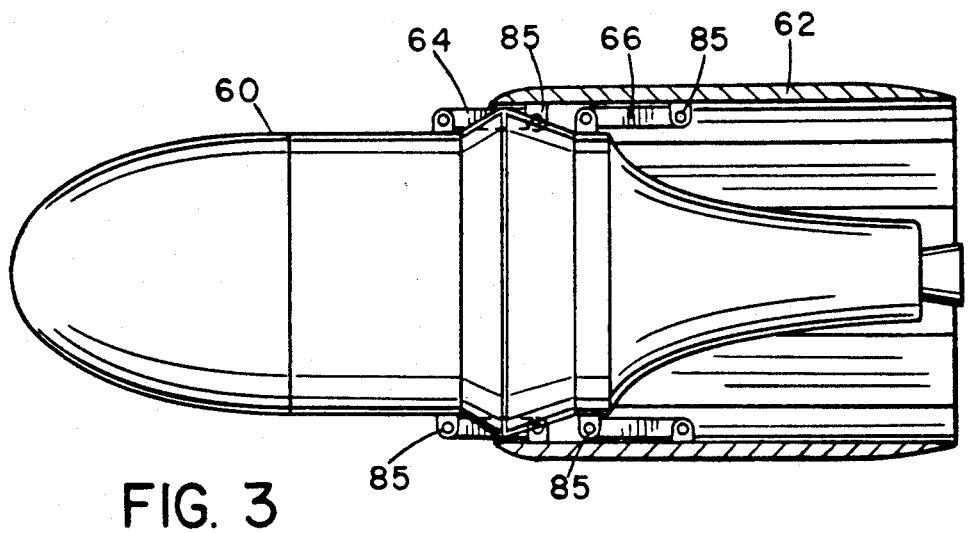
FIG. 3 is a view similar to FIG. 2 illustrating the outer shell in a retracted position.

A vehicle propulsion system according to a first embodiment of the present invention is illustrated in FIGS. 1 and 2 of the drawings. As generally illustrated in FIG. 1, a leading, trail-laying-aircraft 10 flies first along a desired travel path of trailing vehicle 12 and lays one or more fuel trails 14, 16 along the path for ingestion and combustion by one or more trailing vehicles. The leading vehicle may be a conventional type of jet or propeller powered aircraft, as illustrated, and is provided with fuel outlets or suitable fuel dispersal devices at appropriate positions for expelling fuel from the aircraft to form fuel trails.

The fuel or propellant may be ejected as a thick, liquid stream, like water from a fire hose or fog or mist from a nozzle, for example from a suitable outlet 18 at tail fin 20 to form trail 14 which is similar to the condensation trail formed from jet engine exhausts. In FIG. 1, outlet 21 is provided at the tip of wing 22. Fuel outlets may also be provided at various other locations, such as the nacelles of the jet engines so that the propellant trail 14 becomes mixed with the traditional condensation or contrail from the aircraft. The stream or spray of propellant will be in the form of a mist of very small droplets, solid particles or ices for mixing with the atmospheric air to produce a combustive mixture, for example gasoline, JP4, diesel oils, ethanol, methanol, ammonia, chlorinated solvents, hydrazine, and the like. The propellant stream 14 may be laced with ignition promoters such as silane grains or gas. The trail will be of similar characteristics to a traditional aircraft contrail or to the trails used for sky writing, but with suitable propellant droplets or mixtures for fueling the trailing vehicle. Contrails and sky writing trails can exist in the atmosphere for extended periods of time, dependent on the atmospheric conditions, and equivalent principles can be used to produce propellant trails of many kilometers in length.

Contrails demonstrate that a flying aircraft can leave behind it a trail of condensible vapor and particles that can remain confined to a relatively small cross-sectional area of the order of a few times the wingspan of the aircraft.

Figure 5:
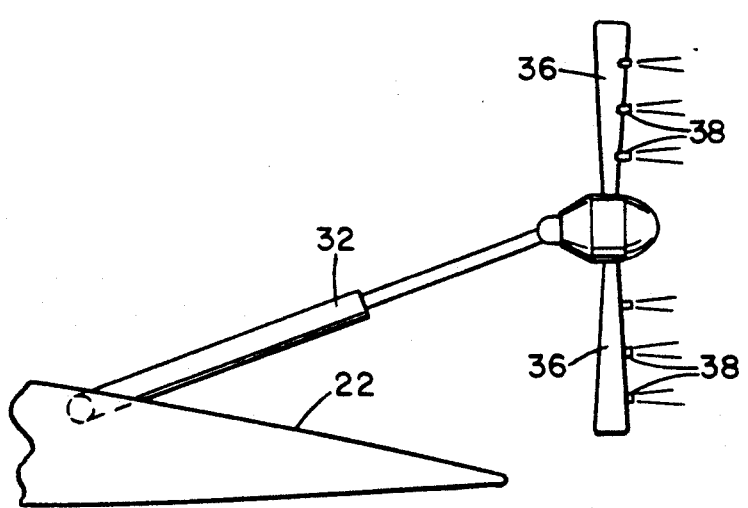
FIG. 5 is a side elevational view illustrating one possible fuel distributing device.
Figure 6:
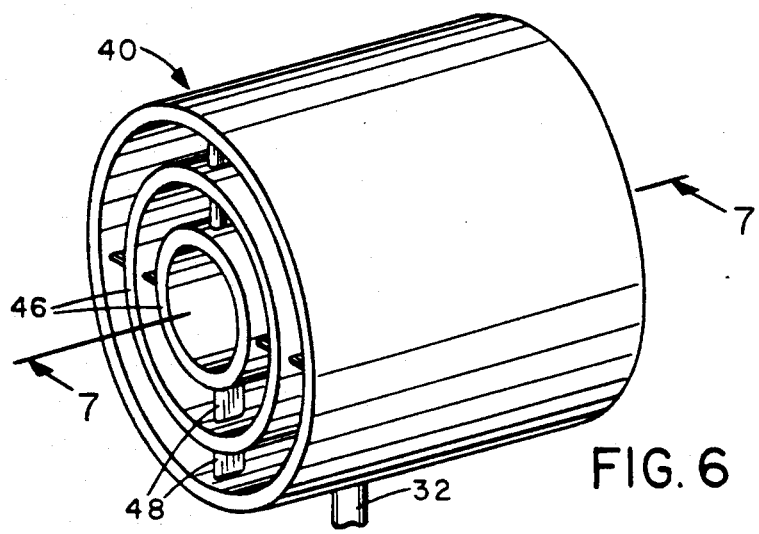
FIG. 6 is a side elevation view of an alternative fuel distributor.
Figure 7:
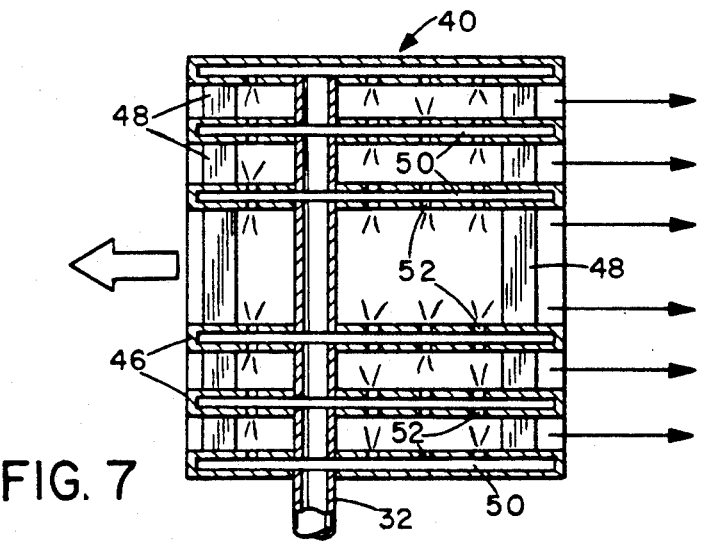
FIG. 7 is a cross-section on the lines 7—7 of FIG. 6.

The trail may be a smooth, laminar flow trail. Alternatively, if necessary to prolong the lifetime of the trail, dependent on the type of fuel and the atmospheric conditions, the trail may be laid down in a turbulent stream to introduce vorticity tending to hold the fuel together. This may be used, for example, where the propellant is in the form of one or more gases. FIGS. 5 to 7 illustrate two possible alternative propellant dispersal devices for mounting on the trail laying aircraft in place of the simple fuel outlets illustrated in FIG. 1. In FIG. 5, dispersal device 30 is held outwardly from the body of the aircraft 10 by a structurally rigid fuel feed line 32, to avoid the air turbulence introduced in the wake of the aircraft. Feed line 32 may be similar to the probes used for mid-air re-fueling of aircraft. A rotating mechanism 34 is mounted at the end of fuel line 32, and two or more blades 36 are mounted on mechanism 34. Each blade is a hollow tubular member connected to the outlet end of the fuel line and having spaced fuel outlets 38 along its length.

Fuel is ejected from the rotating blades to mix the fuel with air. The blades may be mounted for twisting around their longitudinal axis to control the generation of vorticity in the air-fuel stream or trail. The rotating mechanism may be a passively rotating joint or may be an engine for powering the rotation. In the latter case, the blades may be the blades or propellers that also power the aircraft, and may be incorporated as a portion of the normal power system of the aircraft. The fuel in this case may be mixed with the aircraft exhaust or the engine may be turned off and air flow through the engine may be used to mix with the propellant and make the propellant trail.

FIGS. 6 and 7 illustrate an alternative fuel dispersal device 40 comprising a hollow mixing canister mounted at the end of a suitable fuel feed line 32 similar to the feed line in FIG. 5, with its axis parallel to the flight direction so that air flows through the canister in the direction of the arrows. The canister has a number of concentric internal shells 46 with radial support members 48 extending between adjacent shells. The radial support members comprise fuel delivery tubes connected to fuel feed line 32. The outer canister and internal shells are each double walled to define internal spaces or chambers 50 connected to radially directed spray nozzles 52. Fuel exits from the various nozzles 52 and mixes with incoming air entering the canister in the direction of the arrow in FIG. 7 to form a fuel-air trail. Mixing may be promoted by vibration, twisting or rotation of portions of the propellent feed lines under existing aerodynamic forces or deliberately applied forces. The canister may be arranged to introduce a predetermined pattern into the propellant stream by causing an amount of turbulence or vorticity in the stream. Suitable control devices may be included for varying the temperature of the mixture, varying the propellant droplet size or particle size, varying the vapor density, and introducing fractal velocity distributions, for example.

There may be one or more fuel trail laying vehicles for forming a desired fuel trail in the atmosphere, and the trail may be continuous or segmental. FIG. 2 illustrates the trailing vehicle 12 according to one embodiment of the invention in more detail. Vehicle 12 follows the fuel trail and ingests the deposited fuel to propel itself along the trail. More than one vehicle may follow the deposited trail or trails 14, 16.

As illustrated in FIGS. 1 and 2, vehicle 12 basically comprises a shrouded rocket having a central core or payload section 60 and a surrounding cylindrical shroud or outer shell 62 secured to central section 60 via spaced, radial, fore and aft support struts 64, 66. Preferably, four spaced struts 64 are provided at the front and four struts 66 at the aft end of shell 62. An annular combustion chamber 68 is formed between the inner core section 60 and the surrounding shroud 62. Projecting surfaces 70, 72 may be provided on the inner surface of outer shell or shroud 62 and/or on the outer surface of the inner core section 60 to form a compression structure to compress the incoming fuel/air stream. Tapering expansion surface 73 is formed on the core section 60 downstream of the central throat area.

The inner core section 60 of the vehicle has an internal, auxiliary engine or rocket 74 at its aft end supplied from propellant tank or tanks 76 via lines 78. An internal payload section 80 is provided at the forward end of section 60. The internal rocket may be used to lift off the vehicle from earth and accelerate it to a position intercepting the propellant trail, and may also be used to power the vehicle on into space after the propellant trails have been used up. Rocket engine 74 may also be used to maneuver the vehicle in space, to power reentry burns, and to power and land the vehicle after re-entry.

The support struts 64, 66 are preferably hollow and have outlets 81 for allowing propellants and other fluids, both oxidizer and fuels, to be introduced into combustion chamber 68. Similar outlets may be provided on the outer surface of the core section 60 and on the inner surface of the outer shroud 62. The outlets will be connected to suitable fuel tanks via fuel lines (not illustrated).

The fuel inlet gap or spacing between the inner core and outer shroud may be relatively small, of the order of a few centimeters to a few tens of centimeters. Additionally, the inlets to combustion chamber 68 may be segmented so that the vehicle may separately ingest two or more separate streams of propellants for combination further aft in the vehicle. Combustion of the incoming propellant stream may be achieved in several ways. Firstly, the natural compression of the incoming propellant stream at high speed can produce auto-ignition. Ignition may also be stimulated, if necessary, by small flames introduced at outlets 81 on the fore and/or aft struts, which may be produced by burning propellant from the fuel tanks. Ignition promoters such as silane may be injected into the incoming propellant stream via outlets 81.

Combustion of the propellant in chamber 68 produces expansion of combustion gases and thrust on the vehicle to accelerate it along the trail. Exhaust gases will flow out via the open aft end of combustion chamber 68. The vehicle may be designed such that the exhaust gas velocity is close to zero in the rest frame. The additional propellants introduced into combustion chamber 68 via outlets 81 may be used to fine tune the mixture in the propellant trail to maintain optimum combustion or to augment the fuel or oxidizer portion of the trail to enable combustion over a wider range of altitudes, speeds, and mixture ratios. The internal fluids may also be used to cool the nose, struts, and expansion surfaces during flight from earth into space or during re-entry.

The exhaust gas ejection process may be augmented magnetically. For example, magnetic field coils may be embedded in the outer shroud 62 of vehicle 12, and may be powered via an external source or on board unit. The coils will be designed to produce a pulsing magnetic field to squeeze the combusted mixture and eject it at higher velocity.

The outer shell may be adjustably mounted on the inner core of vehicle 12, for example via sliding or translational joints 82 between the struts and the inner core or the outer shroud, respectively. The nose end 84 of the inner core forms the initial compression surface for the incoming propellant mixture, while the outer shroud forms the outer compression surface. The compression surfaces may be continuous around the periphery of the annular combustion chamber or may be laterally segmented.

Figure 4:
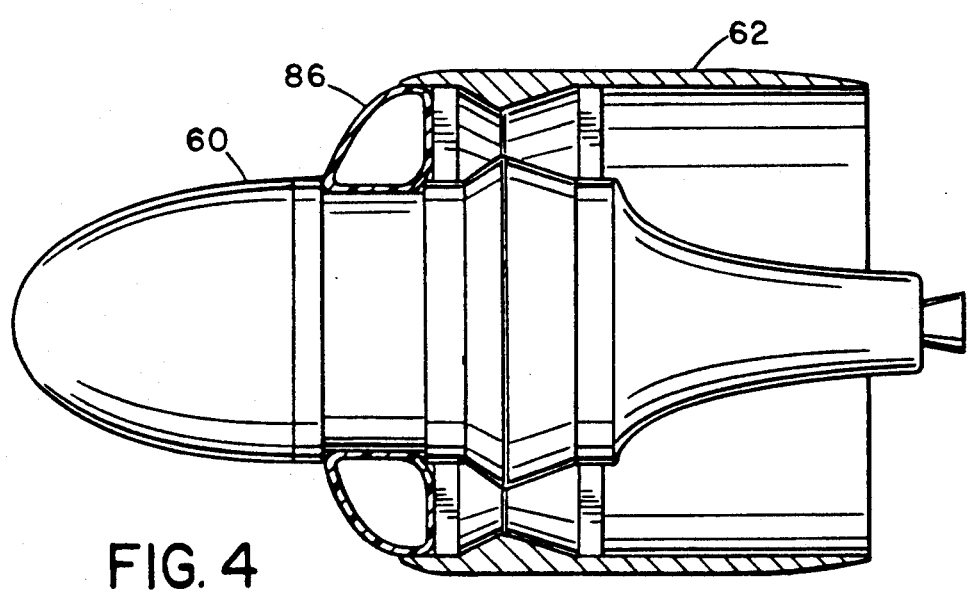
FIG. 4 is a view similar to FIG. 3 illustrating an alternative mechanism for closing the outer shell inlet.

The vehicle 12 may be designed to allow re-entry simply by suitably engineering the various surfaces exposed to high heating to accept and dissipate the heat of re-entry, for example by directing fluids from internal reservoirs along the leading edges and boundary layers of the vehicle. Additionally, the external shroud may be designed to move into a position flush with the inner core during re-entry, to close the gap between the inner core and outer shroud, so that all or most of the heating occurs only on external surfaces of the vehicle, allowing heat to be dispersed or dissipated via radiation or convection of external fluids. In one example, the shroud may be segmented and the segments pivotally secured to the inner core via pivotal strut connections 85 so that they can pivot rearwardly and inwardly into re-entry positions flush with the inner core, as illustrated in FIG. 3. Alternatively, an inflatable plug 86 may be provided for sealing the gap at the forward end of the outer shroud, as illustrated in FIG. 4.

Although in FIG. 1 the leading and trailing vehicles are shown travelling in the same direction along a continuous path, the trail laying vehicle or vehicles may alternatively lay down a series of separate propellant tracks with the trailing vehicle manoeuvering from one track to the next. The trailing vehicle may travel in the opposite direction to the propellant trail laying vehicle.

In the embodiment of FIG. 1, the system is described for laying a propellant trail in the atmosphere of a planet such as earth, with a trailing vehicle using the trail of propellant similar to an aircraft condensation trail for travel from a position close to lift off up to a position close to its desired orbit. Alternatively, the propellant trail may be used to propel a vehicle from one earth position to another, with no space travel involved. Additionally, the propellant trail is not restricted to deposition in the earth's atmosphere. Instead of an aircraft as illustrated in FIG. 1, the trail laying vehicle may be a space vehicle in a suitable orbit designed to lay a trail in space or extremely tenuous atmosphere. This may comprise a dust cloud or fog of mono-propellant ultra-fine grains, such as mixtures of metals or metal hydrides and oxidizers used in conventional solid rockets, and may be distributed along a defined path in space. The propellants may be in the form of solid particles or ice in space or in the high atmosphere. Suitable fuel/oxidizer mixtures for use in earth's atmosphere or in a tenuous atmosphere or space are listed in the following Tables 1 and 2:

TABLE 1

CONTRAILS LAID DOWN IN THE ATMOSPHERE TO REACT WITH AMBIENT OXYGEN:

| Ambient atmosphere | REACTANT | Stabilizer |
|---|---|---|
| OXYGEN | liquids & ices | |
| | gasoline | |
| | JP4 | |
| | diesel oils · | |
| | ethanol | |
| | methanol | |
| | ammonia | |
| | chlorinated solvents | |
| | hydrazine | |
| | Caged compounds | |
| | hydrogen | |
| | | buckmiesterfullerene |
| | carbon (coal, graphite) | |
| Dusts | titanium | |
| | zirconium | |
| | aluminum | |
| | magnesium | |
| | Free radicals of H, O, F, N, Ne, He | |

TABLE 2

TRAIL LAID IN SPACE OR EXTREMELY TENUOUS ATMOSPHERE

| FUEL | | OXIDIZER | |
|---|---|---|---|
| Aluminum powder | Al | Ammonium perchlorate (AP) | $NH_4ClO_4$ |
| Beryllium powder | Be | Potassium perchlorate | $KClO_4$ |
| Beryllium hydride | $BeH_2$ | Sodium perchlorate | $NaClO_4$ |
| Magnesium hydride | $MgH_2$ | Ammonium nitrate | $NH_4NO_3$ |
| Aluminum hydride | $AlH_3$ | Potassium nitrate | $KNO_3$ |
| end-blocked | $x\text{-}SiH_n\text{-}x$ | | |

TABLE 2-continued

TRAIL LAID IN SPACE OR EXTREMELY TENUOUS ATMOSPHERE

| FUEL | | OXIDIZER | |
|---|---|---|---|
| poly (n) silanes | | Nitronium perchlorate | $NO_4ClO_4$ |
| Lithium (oil passivated dust) | Li (oil) | Atmospheric oxygen under compression | $O_2$ |
| Lithium hydride | LiH | | |
| Magnesium (oil passivated dust) | Mg (oil) | Ozone | $O_3$ |
| Polyethylene | $CnH_{2n}$ | | |
| Buckmiesterfullerene (space or atmosphere) | $C_{60}$ or other caging compounds | | |

Figure 8:
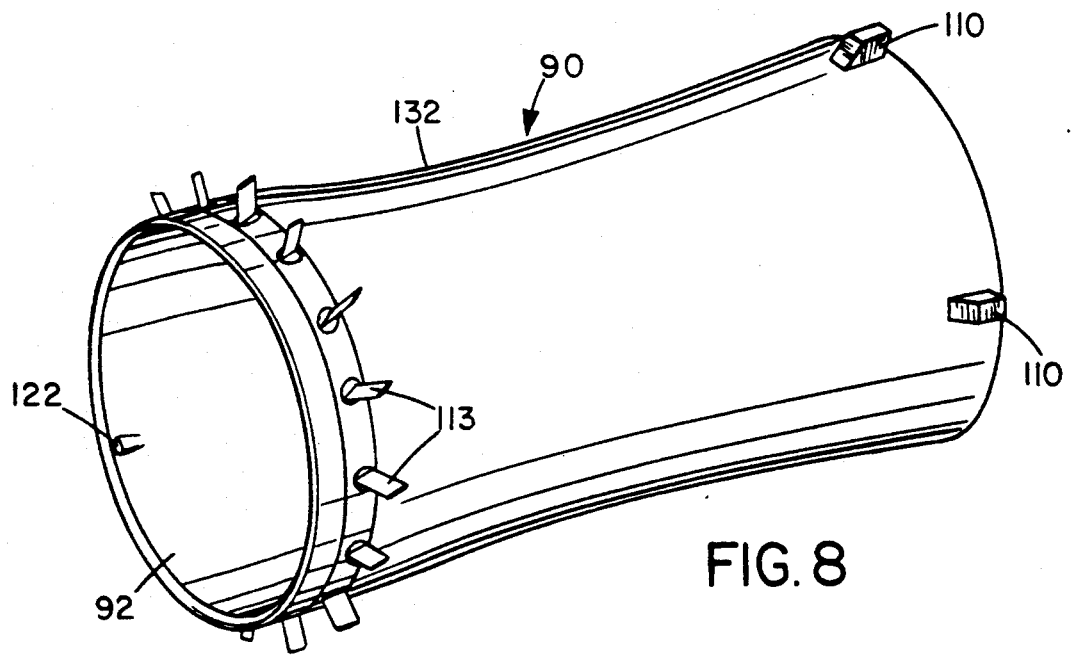
FIG. 8 is a side elevation view of a fuel ingesting vehicle according to another embodiment of the invention.
Figure 9:
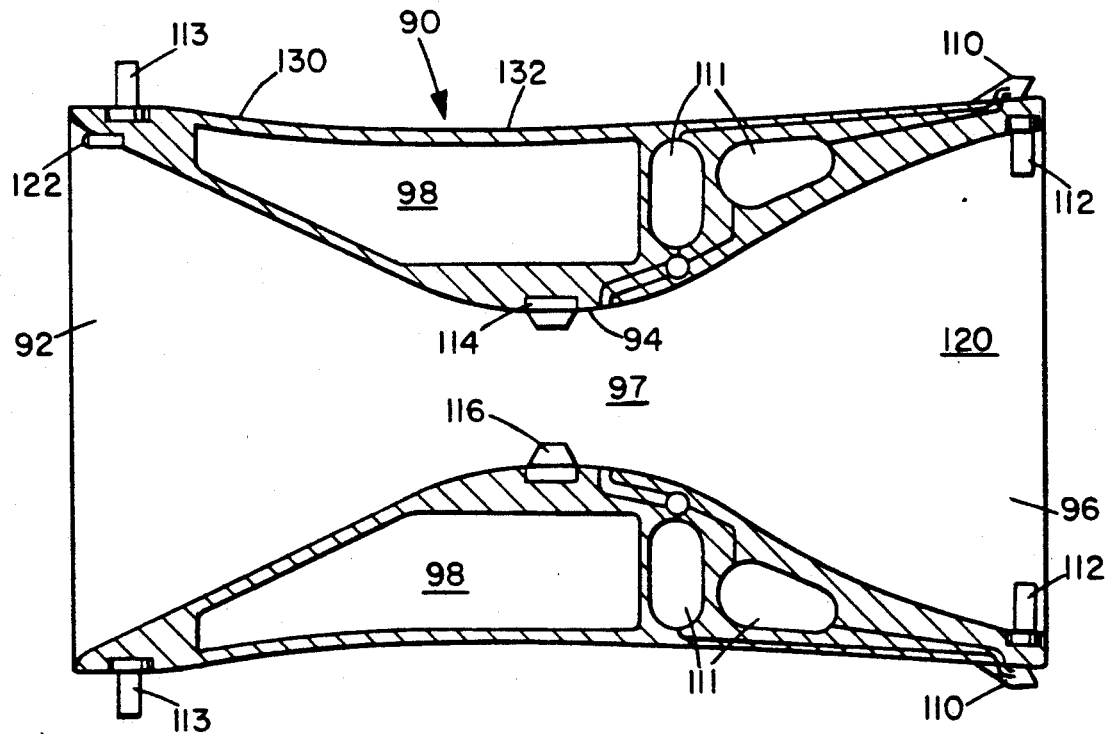
FIG. 9 is a cross-sectional view of the vehicle of FIG. 8.

FIGS. 8 and 9 illustrate a trailing vehicle according to another embodiment of the invention, which may ingest a trail laid by an aircraft in an atmosphere as in FIG. 1 or a trail laid in space or tenuous atmosphere by a space vehicle. In this embodiment the trailing vehicle comprises a toroidal shaped, hollow core vehicle 90. As illustrated in FIG. 9, the vehicle 90 has a variable internal diameter, tapering from a maximum at inlet end 92 to a minimum at the central, throat region 94 and then tapering outwardly to another maximum at the outlet end 96 to form an exhaust nozzle. The inner surface of the vehicle thus tapers inwardly from the inlet end towards the center, both to define an internal combustion chamber 97 in the central, hollow core of the vehicle with a compression surface for incoming propellants and also to allow internal space in the toroidal shell for a crew and payload section 98 and auxiliary rocket engines 110 at the aft end for liftoff and maneuvering purposes. These are fed from suitable internal propellant tanks 111. Four external exhaust control vanes 112 at the exhaust end of the vehicle are used for attitude control.

Vehicle 90 is provided with a plurality of blades or vanes 113 projecting radially outwardly at its forward end. The vanes are preferably used for lift and attitude control. The vanes 113 are rotatably fitted on a rotating ring allowing the vanes to be rotated around the body of the craft as an external turbine to produce aerodynamic driving force. A suitable drive mechanism 114 for rotating the blades or vanes is mounted at an appropriate location within the internal space of the vehicle. Preferably, the orientation of vanes 113 is also adjustable. The blades or vanes 113 may alternatively be mounted just inside the forward lip of the intake section, in which case they will provide more lift but less attitude control than with the illustrated arrangement.

Turbine blades 116 are also provided in the throat section 94 at the center of the combustion chamber. These may be retractably mounted so that they can be retracted into the body of the vehicle at high speeds, or may also act as flame holders for ignition of incoming propellant, and/or as propellant injection devices. The blades may also be extendable inwardly beyond the position illustrated in FIG. 9 to fully or partially close the throat region 94 so that the exhaust chamber 120 may be used as a high expansion rocket chamber in space. The blades are rotatably mounted and may also be driven by drive mechanism 114 to provide aerodynamic lift on take off, landing, and travel through the atmosphere to a propellant trail.

One or more fuel trail sensors 122 for detecting the propellant material in the trail are mounted at the forward end of the vehicle. The sensors are used both to locate the trail and to guide the vehicle along the trail.

Once the vehicle reaches the propellant trail, incoming propellant is compressed in the compression end of the combustion chamber, and will either ignite automatically or be ignited via a suitable ignition mechanism. The combustion gases then expand in the exhaust end of the chamber and accelerate the vehicle along its path.

The outer hull 130 of the vehicle may be of uniform cylindrical shape but preferably has a pinched in waist section 132 between its ends so as to minimize supersonic drag, under the so-called Whitcomb area-rule. Although the illustrated vehicle is cylindrically symmetrical about its longitudinal or flight axis, it may be formed in different shapes, for example so as to give increased aerodynamic lift while travelling through the atmosphere, and may have preferential top and bottom surfaces during normal flight. This also applies to the shrouded vehicle of FIGS. 1 to 3.

Figure 10:
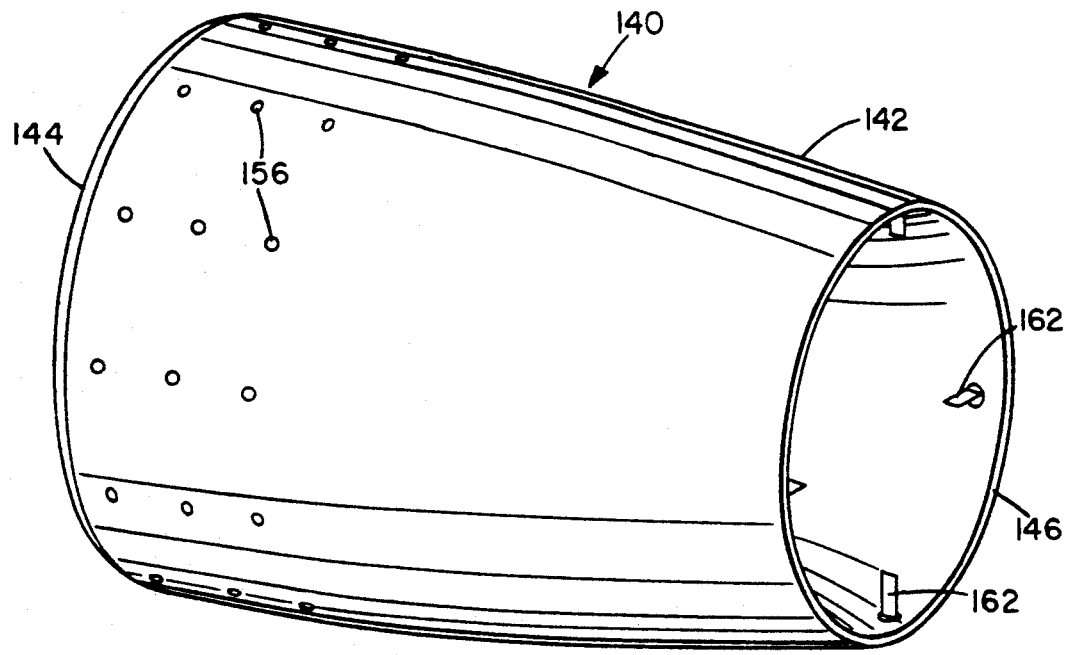
FIG. 10 is a perspective view of a modified fuel ingesting vehicle according to a further embodiment of the invention.
Figure 11:
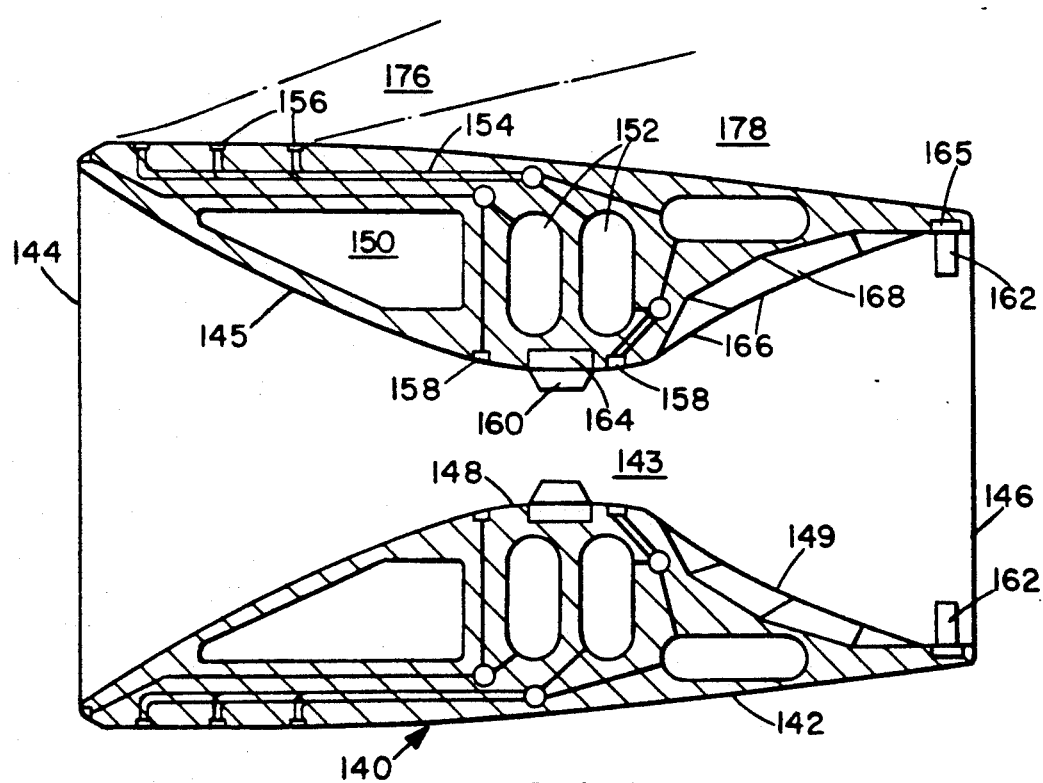
FIG. 11 is a vertical cross-section of the vehicle of FIG. 10.

FIGS. 10 and 11 illustrate a modified toroidal vehicle 140 generally similar to that of FIGS. 8 and 9 but with a rearwardly converging outer surface 142. The hollow core of the vehicle comprises a combustion chamber 143. As in the previous embodiment, the inner surface of the vehicle tapers inwardly from both the forward and aft ends 144, 146 to form a compression surface 145, a central throat region 148, and a rear expansion surface 149. The vehicle has internal payload and crew chambers 150 as well as internal propellant tanks 152 which are connected via internal pipelines 154 to a plurality of outlets 156 spaced around the outer surface 142 adjacent and at its forward end. Propellant outlets 158 are also provided on the inner surface at the throat region. All of the outlets may be circular ports or holes or may take the form of lines or slits to more evenly distribute the propellant into the boundary layer of the passing stream of gas. The vehicle is provided with retractable internal vanes 160, 162 at the throat and exhaust end as in the previous embodiment, and these are controlled via a suitable drive mechanism 164, 165.

Figure 12:
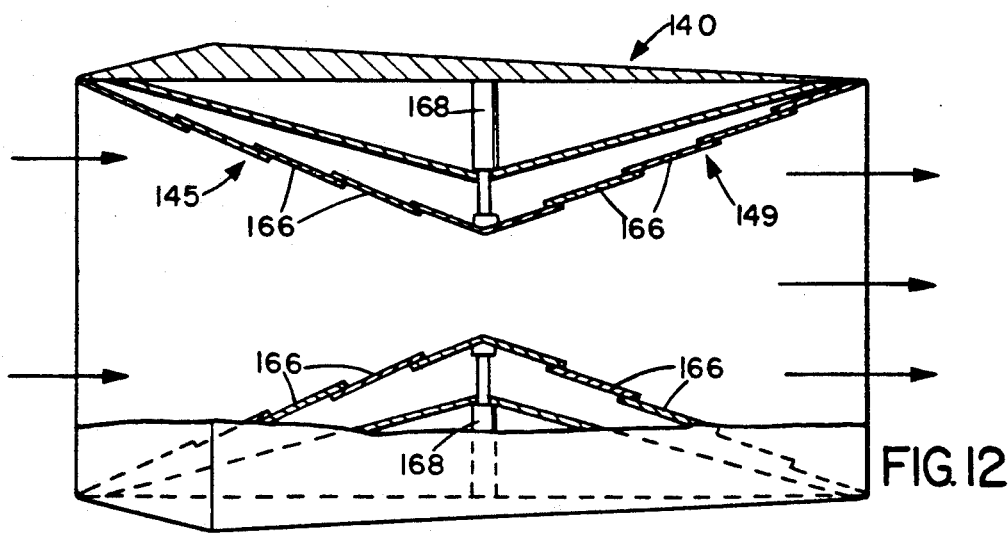
FIG. 12 is a vertical cross-section similar to FIG. 11 illustrating a modification.

Preferably, as illustrated schematically in FIG. 12, the inner surfaces of both the compression region 145 and the expansion region 149 of the combustion chamber 143 are composed of many slidably interconnected plates 166 connected to an internal drive mechanism 168 of variable length. Varying the length of mechanism 168 will change the cross-sectional area of the compression and expansion regions. Several extendible mechanisms 168 may be provided at spaced intervals along the length of the rocket so that each plate can be adjusted individually to provide a larger degree of adjustability in the internal profile. Control of the compression and expansion profiles provides optimal operation of the vehicle at varying speeds.

With the vehicle of FIGS. 10 to 12, supersonic and hypersonic gas flowing down the outer surface of the vehicle is allowed to expand and thus exert a net forward force on the vehicle. The gas stream may be ambient air, portions of the propellant trail (dependent on the trail cross-section) in a combusted or non-combusted state, or a combination of ambient air and propellant. In each case, propellant may be introduced into the external gas flow via ports 156. The vehicle in FIGS. 10 to 12 may be launched and driven to the propellant trail via auxiliary engines (not illustrated) in a similar manner to that described above in connection with FIGS. 8 and 9.

Internal thrust is produced in this embodiment in an equivalent manner to the previous embodiment once the vehicle reaches the propellant trail. This thrust is augmented by external combustion of gases travelling along the outer surface of the vehicle. At supersonic and hypersonic speeds, the incoming air and propellant trail will form a shock 176 at the leading edge of the vehicle, and then will travel along the outside surface of the vehicle. In the inwardly tapering portion of the outer surface, an expansion region 178 is formed where the propellant trail along with any additional fuel and/or oxidizer added via outlets 156 can combust. The excess pressure on the vehicle produced by this external combustion can produce a net thrust on the vehicle. This principle may be used in an alternative arrangement in which there is no internal combustion chamber but instead combustion occurs completely external to the vehicle, via suitably-shaped external compression and expansion surfaces, similar to a plug nozzle.

FIGS. 13 and 14 illustrate another alternative trailing vehicle 180 for travelling along a suitably deposited fuel/air trail 182. The trail may be deposited by any of the methods described above in connection with FIGS. 1 to 7. In FIG. 13, the trailing vehicle is in the form of an oblique flying wing, similar in design to that described in my U.S. Pat. No. 4,836,470. However, the system may use any conventional type of aerospace plane, including those with fixed engines. Instead of carrying all of its propellant internally, vehicle 180 has a forwardly directed inlet 184 on its lower surface 186 for scooping up propellant from the trail 182 and directing it into a jet engine 188. Engine 188 has an exhaust outlet 190 at its trailing end. Vehicle 180 is equipped with standard aerodynamic control surfaces, reaction control rockets and auxiliary rockets, internal propellants, and ancillary equipment for space flight and atmospheric flight outside the propellant trail, and these will not be described in any further detail here since they will be of a conventional nature. Jet engine 188 is preferably rotatably mounted for directional control, although it may be a fixed engine as in conventional aerospace planes.

On approaching the propellent trail 182, the plane is tilted into the orientation illustrated in FIG. 13 at an oblique angle to the trail so that the forebody of the plane in front of the engine inlet 184 acts lo compress a large area of fuel into a high density stream 194 at the engine inlet for combustion in the engine. The incoming fuel may be combusted in the engine itself, or the main combustion may occur aft of the engine immediately under the aft portion of the vehicle.

The use of a propellant trail laid in free space to drive an aerospace plane provides a new method of hypersonic flight that can avoid or greatly minimize the operational and technical limitations of aerospace planes which must carry all their own propellant as a major component of their initial gross mass. The present technical problems in such planes greatly limit their range, payload capabilities, and structural design possibilities.

Most of the present day limitations on long distance point-to-point travel about the earth can be avoided by an aerospace plane using the propulsion system as illustrated in FIG. 1. This vehicle will take off and fly at subsonic speeds like a normal commercial aircraft to a location where it can intersect a suitably laid propellant trail. This may be over a suitably remote location, such as an ocean. The vehicle then accelerates along the trail until it gains sufficient speed to rise ballistically out of the atmosphere and follow the ballistic path to a distant point where it re-enters the atmosphere. At this point it slows to subsonic velocity and glides down to a lower altitude for normal, jet powered subsonic flight to its final destination. In this way, the vehicle does not produce a sonic boom over most of its route, does not experience atmospheric drag, and does not use a significant amount of its propellant to carry internal propellant for support of the entire journey. The same vehicle may be used both for point-to-point travel on earth as well as for Earth-to-orbit flight.

FIG. 15 illustrates another option for forming the propellant trail in free air or space. In this alternative, the trail-laying vehicle 200 comprises a solid rocket casing 202 having a nose cone 204 at its forward end and a rocket nozzle 206 attached at its rear end. The rocket nozzle is made of a high temperature material such as carbon-carbon fiber that can take the heat of exhaust either directly or through ablation. The casing 202 is coated on both its inner and outer surfaces with multiple layers 208, 210, respectively of powdered solid rocket propellant material held in place by a suitable external binder such as wax, epoxy, glue or other plastic material with relatively low mechanical strength. The binder layer is preferably roughened so that, as the rocket flies, the layer will be torn off by air flow past the rocket or projectile and the powdered propellant material will break away in successive layers.

The internal propellant layers 208 are burnt in the combustion chamber 212 to propel the rocket along the desired propellant trail, while the outer layers 210 ablate due to motion through the air, partial burning, or spinning of the rocket through the air, or combinations of these processes. The ablation of the outer layers results in deposition of a trail 214 of unburnt particles and gases for ingestion and combustion by a trailing vehicle. Alternatively, the solid rocket exhaust from the internal combustion chamber may be designed to be fuel rich due to incomplete combustion and could itself form the fuel/air trail on mixing with atmospheric air. This avoids the need for external layers of fuel material to be sloughed off.

The powdered propellant material may be a metal powder such as aluminum, lithium, or similar materials, or may be a material such as polyethylene. The binder material may be of low mechanical strength, as mentioned above, or may be designed to evaporate or be burnt away, such as camphor, naphthalene, fluorocarbon compounds, ester waxes, ices, or polymeric binders as are commonly used in solid rockets. Where the binder layer combusts away to release the propellant, it will be designed to have a lower combustion temperature than the propellant material, such as paraffin wax, for example. The binder may also form a component of the propellant trail, for example ester waxes which would leave a very long-lived fog.

The rocket casing may itself be made up of a layer of the binder material so that it is entirely consumed in laying the propellant trail. Thus, ideally, there is little or nothing left of the trail-laying rocket at the end of its flight. Alternatively, the casing may be of a more permanent material which is not consumed in forming the trail, but simply acts as a support for the inner and outer propellant layers.

As mentioned above, the rocket may be designed to fly in a straight path along the desired trail, with the propellant layers being abraded away by the air flow and/or burning of the binder material. If necessary, the rocket may be controlled to spin along its axis, using centrifugal force, as well as aerodynamic heating to assist in throwing materials away from the rocket body.

Drag pressure on the front end of a vehicle travelling through the atmosphere is proportional to the local atmospheric density, the square of the velocity of the vehicle, and its cross-sectional area. At high speeds most of the energy of on-board propellant can be spent forcing the vehicle through the atmosphere against this drag. Thus, it is highly desirable for any flying vehicle to operate at as high an altitude as possible, where the atmospheric density is lower. The combustion of the propellant trail in the propulsion system of this invention can be arranged to minimize atmospheric drag problems. The vehicles themselves are also designed to reduce the effect of air drag.

FIG. 16 illustrates a modified system in which a fuel trail 110 deposited by an aircraft as in FIG. 1, or by a solid rocket as in FIG. 17, is pre-ignited. In the embodiment illustrated in FIG. 16, a fuel ingesting vehicle 230 for flying along a propellant trail has lasers 232 attached to its forward end 234. The vehicle 230 has an inner payload section 236 having a hollow core defining a combustion chamber 238, and a short outer ring or shroud 240 secured to the forward end of the payload section 236. The section 236 has an internal compression surface 242 followed by expansion surface 244, while the space 245 between the outer ring 240 and the section 236 defines an outer compression region followed by an exterior expansion surface 246.

The lasers 232 are directed towards a ring-like area 248 just in front of the vehicle, where they intersect to ignite an annular plug of fuel-air mixture in fuel trail 220 previously laid down in the manner described above in connection with FIGS. 1 or 15. The ignited annular plug begins to expand and force gas in the vicinity outwardly and inwardly. Thus, the lasers continuously create an explosive torus of gas just in front of the vehicle.

The continuously created ring then compresses the fuel air mixture towards the center of the ring, and thus towards the center 254 of the flight path, and also compresses gas outwardly towards the edge of the craft in region 256. Between these two inward and outward gas flows is a rarified region 250 where the density will be lower than ambient density. Thus, the vehicle can fly into a region of lower density, and will experience less drag force, allowing it to accelerate faster. The size and shape of the ring or plug 248 will be dependent on the geometry of the trailing vehicle. In the illustrated embodiment, the explosive region is on the symmetry axis and primarily produces an outward flow of the remaining fuel-air mixture. Alternatively, the torus could work on the outer region of the trial and compress the trail into the central portion of a vehicle. To a rough approximation, the ratio of the radius of the compression zone to the distance in front of the minimum intake of the vehicle is proportional to the ratio of the velocity of the vehicle to the explosive speed of the ignited propellant mixture.

The explosive process could be maintained via a long probe extending from the forward end of the vehicle. Alternatively, the vehicle may have an extended intake section and the fuel may be ignited at the first part of the intake. The technique of pre-igniting a portion of the trail enables the use of a denser atmosphere, with greater propulsion forces and lower net drag on the vehicle. Pre-compression of the trail can also significantly reduce the sonic boom associated with travel of an object through the air at supersonic speeds.

Although in the embodiment described above lasers 232 create an explosive ring area 248, area 248 may alternatively comprise an actual solid ring supported on struts in front of the nose of the vehicle at the same position, which will also cause a similar compression of the trail.

The propellants in the two compressed regions of gas 254, 256 may come from different sources, for example two different streams laid down by a trail laying aircraft. Additionally, the vehicle may have intakes for receiving the propellant and another set of intakes for receiving ambient atmosphere for mixing with the propellant for additional control over combustion.

Although in FIG. 16, lasers are used to pre-ignite or energize a previously laid trail, they may also be used to energize exhaust gases in the trail laying vehicle itself. Beam forming devices may also be used in an equivalent manner to create a trail from the ambient atmosphere. Such devices may be mounted on the vehicle itself, as in FIG. 16, or may be mounted on a platform on earth, in the atmosphere, or in space. FIG. 17 illustrates a modification in which an external system is used either to change the energetic nature of an existing trail, or to create a trail from the ambient atmosphere. In FIG. 17, two beams 260, 262 intersect in an area 264 just in front of the vehicle 266, which may be similar to that illustrated in FIG. 2, for example. The beamed energy may be in the form of laser, microwaves or particle beams of electrons, charged particles, or accelerated beams of ignition materials. The beams may operate on an existing trail 268 to modify it and change it into a new and more energetic propellant combination. The external beams could also upgrade propellant just before it is released from the trail laying vehicle. For example, a tuned laser beam can change methane into atomic hydrogen and carbon. The energy beams may be broad and even non-focused rays, such as sunlight, used over a long period of time to lift the energy level of trail 268. For example, oxygen can be converted into ozone in this way.

Instead of modifying an existing trail, the energy beams may be arranged to create a new propellant from the ambient gas just in front of vehicle 266. For example, twin laser beams, each tuned to half the adsorption energy of nitrogen gas or oxygen, could be crossed to create fully ionized and extremely energetic nitrogen and oxygen in the crossover region 264. Adsorption of beams in the atmosphere is minimized by using the lower frequencies in the primary beams and employing two photon adsorption to create molecules in the region 264. Two or more beams may be used. A similar technique could be used on a trail of hydrogen ice in space to provide atomic hydrogen to a spacecraft.

This technique may potentially be used to lay out trails of free radicals (H, O, F, N, Ne, He) at high altitudes, where collision rates are relatively low. Free radicals would release far greater energy in chemical reactions than occur with the corresponding diatomic species, ($H_2$, $O_2$, $F_2$, $N_2$, $Ne_2$, $He_2$). Laser beams, tuned to maximum resonance with the molecules, can be directed at the trail just in front of the vehicle and energize the molecules from diatomic to the atomic state. Before the molecules have a chance to re-join into the diatomic state, they are swept into the combustion chamber and compressed with the ambient atmosphere, giving up their energy to the gas and increasing the effective thrust.

Although the beam forming devices such as lasers may be mounted on the vehicle itself, as in FIG. 16, for effective, long-term operation the lasers would have to be energized by an alternative power source not dependent on the vehicle's internal propellants, for example a nuclear power generator. Alternatively, part of the propellant trail may be used for operating the beam system.

Estimates have shown that the payload proportion of the gross lift off weight (GLOW) of various types of known rockets can be increased significantly by use of a propellant trail to supply fuel. A 99 mile long trail can increase payload capacity from 1.4% to 13 to 20%, and contrails of this length are often seen from aircraft. Thus, a fuel trail of this length laid down in a similar manner to an aircraft contrail can significantly increase vehicle payload capacity.

The trails can be laid from ground level to the top of the atmosphere. The length of a given trail will be determined by the turbulence of the atmosphere (which varies greatly from time-to-time and place-to-place), the speed of the vehicle that lays the trail, the rate at which the trail diffuses (related to turbulence), the pattern of winds over the relevant range of altitudes, the duration of time between when the trail is laid at a given point and the time that the portion of the trail is consumed, and the acceleration of the vehicle that uses the trail. The greater the altitude range and length of the segments that make up a given trail, the greater the number of trail-laying vehicles that will be required. Condensation trails tend to live a long time (10s minutes to hours) near the top of the troposphere.

The troposphere extends from ground level up to approximately 11 km (35,000 feet). Most propeller power planes fly primarily in the troposphere, and may be used to lay trails in this region. In the troposphere the temperature of the air drops approximately 6.5° Kelvin per one kilometer of altitude increase. This temperature drop makes the air in the troposphere unstable against clouds (in which water vapor is changing to droplets and releasing heat) or pockets of gas that have excess heat energy. The excess heat energy makes that cloud or pocket of gas or stream of hot air, such as above a portion of ground that is solar heated, to rise like a hot air balloon. The rising air causes local turbulence that will dissipate a fuel/air trail rather rapidly. Of course there are times, such as often happens in the morning, in which the troposphere in a region will be very still.

Between 11 and 25 kilometers lies the stratosphere. In this range of altitudes the temperature of the atmosphere is relatively constant at 210 to 220 Kelvin. Most jet aircraft cruise in the lower portion of the stratosphere, and may be used to lay trails in this region. Hot streams of air rising into this region expand and decrease in temperature and lose their lift. This is why even very tall cumulus clouds usually top out at 40 to 65,000 feet. Except for these very tall and rare clouds and turbulence at the edge and sometimes inside the jet stream the stratosphere has little turbulence and is a good place to lay down very long contrails (10s to 100 kilometers) and fuel/air trails. The trails can be laid down over a range of altitudes within this portion of the stratosphere. There are winds aloft at all altitudes that must be accounted for. The trails may be laid down over different ground tracks before the launch vehicle begins its flight. The trails would be laid down so that they drift into proper alignment during the time the launch vehicle is passing along them. The stratosphere usually contains little water vapor. Thus, condensation trails are rarely seen above the troposphere in the stratosphere.

Between approximately 25 km and 47 km, in the mesosphere, the temperature of the atmosphere increases with altitude. The supersonic Concord flies at the top of the stratosphere and the bottom of the mesosphere. The SR-71 Mach 3 reconnaissance jet and the U-2 subsonic reconnaissance jet fly in the mesosphere. This mesosphere portion is extremely stable against turbulence and is extremely dry. Thus, contrails do not show but fuel/air trails would be very stable. Only winds at that altitude would be of concern and adjusted for during the laying out of a trail.

It is difficult for aircraft to operate above the mesosphere due to the low atmospheric density. Thus, above the mesosphere the fuel/air trail could be laid down by a rocket or from an artillery shell or a vehicle or object coming in from space that releases the trail materials on the way down or through the atmosphere.

In summary, the trails can be laid over a very wide range of altitudes and lengths. The short trails can be laid as a single length and altitude by a single craft and with minimum worry about distortion. The longer trails will have to be laid down by several craft and the winds along the trail will have to be accounted for and the launch vehicle started at a precise time.

In one example assuming the trailing vehicle comprises a passenger craft such as an aerospace plane for travel between two points on earth, multiple trail laying aircraft and/or rockets may be used to lay down a series of fuel trail sections extending for up to 285 miles, for example. The trailing vehicle flies from one trail section to the next. Calculations have shown that this technique could provide an increase of up to 30% in payload capacity. The different trail sections may have similar or different physical characteristics, such as fuel type, density, trail width, length, and so on.

The external propellant trail also produces significant advances in launching rockets into space. An Atlas type booster, launched conventionally, has a payload capacity of only about 3% of GLOW. Calculations have shown that by accelerating such a rocket along 107 miles of fuel trail, payload capacity could potentially be increased to approach 20% of GLOW.

Other advantages of the propulsion system of this invention are that rockets can be made much more rugged and thus safer and more readily reusable, since they do not have to be made of such lightweight structures and material when they do not have to carry and accelerate all their propellant load. Since less propellant is carried on board, the explosion risk in flight and on the ground is reduced. Many more propellant combinations can be used than is practical under existing circumstances when all must be carried on board.

The propulsion system can be used for space, aerospace, and atmospheric flight operations. Point-to-point hypersonic flight in the atmosphere should be enabled by this system because of increased economy and the reduction of sonic booms, as discussed above. Less expensive satellite launching capabilities are possible with this system, for example via a solid rocket trail laying vehicle launched via field artillery, followed by a ram jet vehicle of the type illustrated in FIGS. 10 to 12. Unmanned satellite vehicles can experience very high accelerations and can therefore accelerate to orbital velocity over relatively short paths of the order of 10 l Km.

A simple model has been used to calculate potential results in one example of a fuel-air rocket for ingesting a pre-laid fuel trail. This model assumes dimensions of the order of those of a space shuttle external tank, in other words a radius of 3.50 m, a length of 50 m, and a mass of 900,000 Kg. The following equation was used to calculate acceleration:

$$\text{Acceleration} = 0.5(C_d + R_o/(C \times R_v \times L)) \times (2C^2 \times dV/(C_d \times V) - 1)V^2 \times R(h)$$

where Cd is the drag coefficient, Ro is the air density at sea level, and C is the trail compression, which is a factor greater than or equal to one which allows for the compression of the trail into the inlets of the vehicle—which increases the mass flow and decreases the drag. Rv is the tank or vehicle density with engines and payload, L is the length of the vehicle, dV is the estimated exhaust velocity, h is the altitude, and $R(h) = EXP(-0.171 h)$, a model for the air density at the calculated altitude.

In this model, the rocket starts along the trail at an altitude of 10 km, then drops down to 6.4 km as it accelerates. After 200 miles of ground path it has achieved 6,000 m/sec or about 80% of orbital velocity from a start of 800 m/sec at the beginning of the fuel trail. This corresponds to an increase in available payload fraction to the order of 0.277.

There are many possible vehicles which can be designed for scooping up fuel from a previously laid fuel trail to provide propulsion, including rocket type vehicles and aerospace planes, as discussed above. In each case, payload capacity is increased by the reduction in the amount of on-board fuel which must be carried, and the vehicle itself can be made of a stronger and safer structure since a light weight structure is no longer an essential factor.

Although some preferred embodiments of the invention have been described above by way of example only, it will be understood by those skilled in the field that modifications may be made to the disclosed embodiments without departing from the scope of the invention, which is defined by the appended claims.

I claim:

1. A vehicle propulsion system, comprising:
a vehicle designed for travel along an arranged travel path in a single extended surrounding medium;
propellant depositing means for distributing propellant into a propellant trail having no structural constraint in the extended medium and extending along at least part of the travel path in advance of the vehicle; and
the vehicle having combustion means for immediate combustion and expansion of at least some of the propellant distributed along the path to produce thrust on the vehicle, and exhaust means for expelling burnt propellant from the vehicle.

2. The vehicle propulsion system as claimed in claim 1, wherein said propellant depositing means comprises a trail laying vehicle for flying along the travel path in advance of said first mentioned vehicle, said trail laying vehicle having at least one propellant distributing means for distributing at least one trail of propellant along the travel path.

3. The system as claimed in claim 2, wherein said trail laying vehicle has a plurality of propellant outlets on its surfaces, and internal propellant supplies connected to said outlets, said outlets comprising said propellant distributing means.

4. The system as claimed in claim 2, wherein said propellant distributing means comprises spray means having a plurality of spray nozzles for distributing propellant along the travel path.

5. The system as claimed in claim 2, wherein said trail laying vehicle comprises an aircraft.

6. The system as claimed in claim 1, wherein said propellant depositing means comprises means for laying a plurality of trails along said path.

7. The system as claimed in claim 6, wherein said trails have different physical characteristics.

8. The system as claimed in claim 1, wherein said vehicle has at least one inlet for ingesting at least some of the propellant distributed along the path directly from the path, and a combustion chamber connected directly to said inlet for immediate combustion of the ingested propellant.

9. The system as claimed in claim 8, wherein said vehicle comprises a rocket having a generally central body section, an outer shroud of larger cross-sectional area than said body section surrounding said body section along at least part of its length, and at least one strut connecting said outer shroud to said body section, said body section having internal payload chambers and propellant chambers, and rocket nozzles at its aft end connected to said propellant chambers, a space defined between said body section and outer shroud comprising said combustion chamber, said inlet comprising the forward end of said combustion chamber, and said exhaust means comprising the aft end of said combustion chamber.

10. The system as claimed in claim 9, including at least one compression surface on one of the surfaces of said outer shroud and body section facing said combustion chamber for compressing propellant flowing into said chamber from said trail.

11. The system as claimed in claim 9, wherein said central body section is of gradually reducing cross-sectional area aft of said combustion chamber to provide an expansion surface for allowing expansion of gases flowing out of said chamber.

12. The system as claimed in claim 9, including retractable mounting means for retractably mounting said outer shroud for movement between a fully extended position for flight along the propellant trail and a retracted position flush with the outer surface of the central body section for launch and re-entry.

13. The system as claimed in claim 9, including retractable plug means for blocking said combustion chamber inlet on re-entry after space flight of said rocket.

14. The system as claimed in claim 8, wherein said vehicle comprises a hollow rocket comprising an outer hull having a hollow central core comprising a combustion chamber, the combustion chamber being open at the forward end of the rocket to provide said inlet for ingesting propellant from the trail, and open at the aft end of the rocket to provide said exhaust means.

15. The system as claimed in claim 14, including lift and control rockets mounted at the aft end of said hull for launching and propelling the vehicle to intersect said fuel trail, said hull having internal propellant tanks supplying fuel to said rockets.

16. The system as claimed in claim 14, including an annular outer shroud of larger cross-sectional dimensions than said hull, and a plurality of struts securing said outer shroud to the forward end of said hull, the surface of said hull rear of said outer shroud converging rearwardly to provide an expansion surface, and said rocket ingesting propellant into said central combustion chamber and into an external chamber between said hull and outer shroud.

17. The system as claimed in claim 14, wherein said hull has an outer surface of substantially uniform width dimensions along its length, and an inner surface of varying cross-sectional area, the inner surface having a minimum cross-sectional area at a central expanded region of said hull forming a throat region of said combustion chamber, and having a forward compression surface tapering inwardly from the forward end of the hull towards said central region, and an aft expansion surface tapering outwardly from said central region to the rear end of the hull.

18. The system as claimed in claim 17, including turbine blades mounted at the throat region of said combustion chamber, and rotational drive means for rotating said blades for providing lift to said rocket.

19. The system as claimed in claim 17, wherein said outer surface of said hull has a central, reduced diameter waist region.

20. The system as claimed in claim 17, including a plurality of control vanes spaced around the hull at the forward end of the vehicle for controlling lift and attitude of the vehicle.

21. The system as claimed in claim 14, wherein the outer surface of the hull converges rearwardly to provide an external, aft gas expansion surface.

22. The system as claimed in claim 21, wherein said hull has internal propellant tanks and outlets on its outer surface connected to said tanks for adding other propellant materials to the externally provided propellant flowing over the outer surface of the vehicle.

23. The system as claimed in claim 22, wherein said hull has outlets on its inner surface connected to said propellant tanks for adding other propellant materials to the externally provided materials ingested into the combustion chamber.

24. The system as claimed in claim 21, wherein the inner surface of the hull is of variable shape.

25. The system as claimed in claim 1, wherein said vehicle has external compression and expansion surfaces for compression, ignition, and combustion of propellant in said path.

26. The system as claimed in claim 1, wherein said propellant depositing means comprises a solid fuel rocket having propulsion means for flying the rocket along the travel path in advance of said vehicle, said rocket having layers of powdered solid fuel material adhesively secured to at least some of its surfaces for forming a trail of fuel particles.

27. The system as claimed in claim 1, including beam forming means for forming an energy beam directed at the propellant trail to energize the trail at a point in front of said vehicle.

28. The system as claimed in claim 27, wherein said beam forming means comprises means for creating said propellant trail out of the surrounding ambient gas.

29. The system as claimed in claim 27, wherein said beam forming means comprises a plurality of lasers mounted at the forward end of said vehicle and directed to intersect at a predetermined area in front of said vehicle.

30. The system as claimed in claim 1, including beam forming means for forming an energy beam directed at said propellant supply means for energizing said propellant.

31. The system as claimed in claim 1, wherein said vehicle comprises an aerospace plane for flight in the atmosphere and in space, the plane having an upper surface and a lower surface, a jet engine mounted on its lower surface, the engine having an internal combustion chamber, an inlet at its forward end for ingesting fuel from the trail, and an exhaust outlet at its rearward end, and the plane having auxiliary rockets for flying the plane outside the fuel trail.

32. The system as claimed in claim 31, wherein the engine is rotatably mounted on the lower surface of the plane.

33. A vehicle propulsion system, comprising:
a vehicle designed for travel along an arranged travel path in an extended surrounding medium;
propellant depositing means for distributing propellant into the extended medium along at least part of the travel path in advance of the vehicle;
the vehicle being combustion means for combustion and expansion of at least some of the propellant distributed along the path to produce thrust on the vehicle, and exhaust means for expelling burnt propellant from the vehicle;
said propellant depositing means comprising a trail laying vehicle for flying along the travel path in advance of said first mentioned vehicle, said trail laying vehicle having at least one propellant distributing means for distributing at least one trail of propellant along the travel path; and
said propellant distributing means including means for inducing turbulent flow in the material distributed along the trail.

34. A method of propelling a vehicle for flight through the atmosphere and/or space, comprising the steps of:
depositing an extended trail of propellant with no structural constraint along at least part of the desired flight path of a vehicle in an extended medium;
propelling the vehicle to a first end of the trail; and
igniting and burning propellant from the trail and directing exhaust gases away from the vehicle to accelerate the vehicle along its path.

35. The method as claimed in claim 34, wherein the step of depositing the propellant trail comprises flying an aircraft along part of the flight path and depositing propellant via outlets at the aft end of the aircraft to form a trail of propellant trailing the aircraft.

36. The method as claimed in claim 35, further including the step of inducing turbulence in the propellant trail as propellant is deposited along the trail.

37. The method as claimed in claim 34, wherein propellant from the trail is directed into an internal combustion chamber of the vehicle.

38. The method as claimed in claim 34, wherein propellant from the trail is directed over external compression and expansion surfaces on the vehicle and ignited for external combustion and reaction of the trail against the vehicle.

39. The method as claimed in claim 34, wherein the trail is laid out in the stratosphere at a substantially constant altitude.

40. The method as claimed in claim 34, wherein an external energy beam is directed at the propellant trail to energize the propellant.

41. The method as claimed in claim 40, wherein the energy beam is directed at the ambient atmosphere in front of the vehicle.

42. The method of propelling a vehicle as claimed in claim 34, wherein the steps of depositing an extended trail and propelling the vehicle to a first end of the trail comprise:

flying the vehicle in a first direction along part of the desired flight path of the vehicle and depositing a trail of propellant from the vehicle along the flight path; and redirecting the vehicle to fly back along the flight path a second time; and the step of igniting and burning propellant comprises igniting and burning propellant previously deposited in the trail by the vehicle for combustion to accelerate the vehicle as it flies back along the path the second time.

43. A vehicle propulsion system, comprising:

a first trail laying vehicle for laying a trail of fuel with no structural constraint along at least part of a desired flight path of a vehicle in a free surrounding gaseous medium;

a second, trailing vehicle having a primary combustion chamber, inlet means at the forward end of the vehicle for ingesting fuel from the contrail into said primary combustion chamber, and an exhaust outlet at the aft end of the vehicle for expelling burnt fuel from the combustion chamber; and the trailing vehicle including auxiliary propulsion means for propelling said vehicle outside said fuel trail.

* * * * *

UNITED STATES PATENT AND TRADEMARK OFFICE
CERTIFICATE OF CORRECTION

PATENT NO. : 5,224,663
DATED      : JULY 6, 1993
INVENTOR(S): DAVID R. CRISWELL

It is certified that error appears in the above-indentified patent and that said Letters Patent is hereby corrected as shown below:

COLUMN 22, LINE 10, CHANGE "CONTRAIL" TO --TRAIL--.

Signed and Sealed this

Nineteenth Day of December, 1995

Attest:

BRUCE LEHMAN

*Attesting Officer*        *Commissioner of Patents and Trademarks*